United States Patent [19]

Durbeck et al.

[11] 4,247,907
[45] Jan. 27, 1981

[54] METHOD AND APPARATUS FOR TYPING CHARACTERS AND OPTICALLY READABLE BINARY REPRESENTATIONS THEREOF ON SAME PAGE

[75] Inventors: Robert C. Durbeck, Los Gatos; Kapali P. Eswaran, San Jose, both of Calif.

[73] Assignee: International Business Machines Corporation, Armonk, N.Y.

[21] Appl. No.: 963,826

[22] Filed: Nov. 27, 1978

[51] Int. Cl.³ .......................... G06F 1/00; B41J 5/00
[52] U.S. Cl. ................................... 364/900; 400/104
[58] Field of Search ... 364/200 MS File, 900 MS File; 400/103, 104, 105, 149

[56] References Cited

U.S. PATENT DOCUMENTS

| | | | |
|---|---|---|---|
| 2,958,568 | 11/1960 | Hagelbarger | 400/105 X |
| 3,341,960 | 11/1970 | Dilsner et al. | 400/104 X |
| 3,620,344 | 11/1971 | Clancy et al. | 400/149 X |
| 3,657,522 | 4/1972 | Wildhaber | 400/104 X |
| 3,719,262 | 3/1973 | Taplin | 400/105 |

*Primary Examiner*—Raulfe B. Zache
*Attorney, Agent, or Firm*—Otto Schmid, Jr.

[57] ABSTRACT

Composer method and apparatus are disclosed in which human readable representations of characters are typed on the first part of a page and are thereafter typed on a second part of the page in the machine readable form. Key stroke signals generated by the typewriter keyboard are stored in a memory prior to being applied to access corresponding type ball positioning signals within a table to print the characters using a conventional type ball on the first portion of the page. Thereafter, the conventional type ball is replaced by a special type ball and the key stroke signals stored in the memory are used to access corresponding ones of a different set of type ball positioning signals within a second memory to enable the special type ball to type optically readable binary coded representations of the characters on the second part of the page. Each character is represented by a string of seven bits plus a parity bit which are typed using either a single strike of a group of eight bits on the special type ball or two different strikes using two different groups of four bits on the special type ball.

18 Claims, 10 Drawing Figures

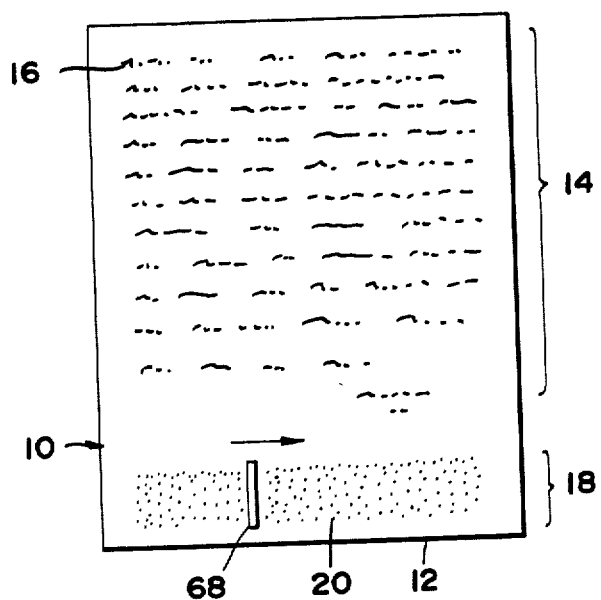
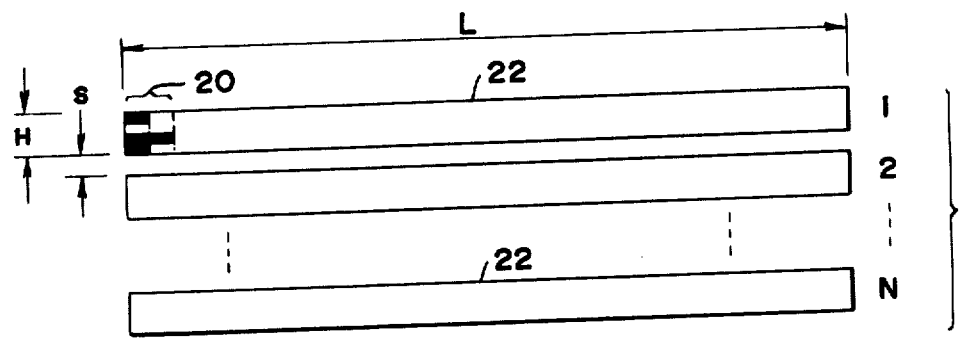
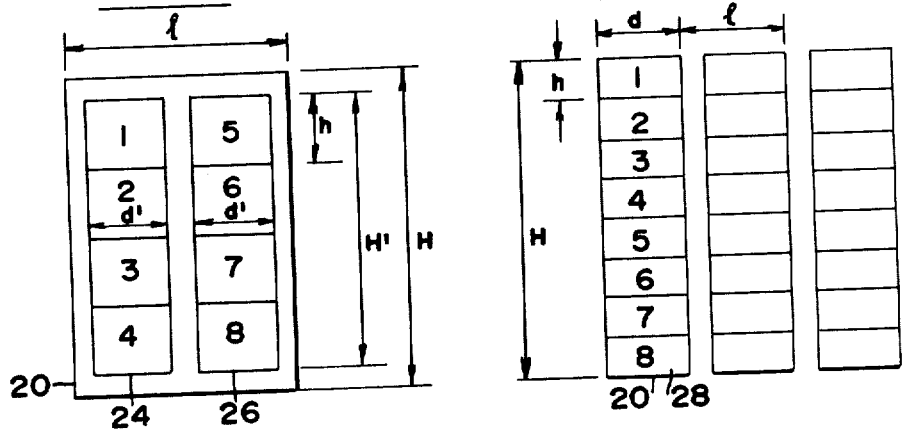
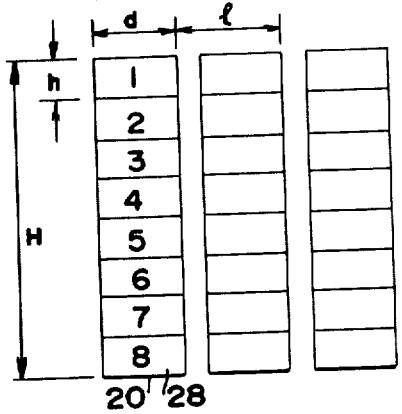

METHOD AND APPARATUS FOR TYPING CHARACTERS AND OPTICALLY READABLE BINARY REPRESENTATIONS THEREOF ON SAME PAGE

BACKGROUND OF THE INVENTION

1. History of the Invention

The present invention relates to a method and apparatus for printing human-readable and machine-readable indicia on printable media, and more particularly to a method and apparatus for printing human-readable characters and machine-readable representations thereof on the same page.

2. History of the Prior Art

With the continued development of data processing equipment and the capabilities and applications therefor, it has become necessary or desirable to be able to machine-read printed characters in various applications. Such requirement may arise, for example, where typewritten characters on a page are to be stored, communicated or otherwise processed. One common way is to scan the page by an appropriate scanning matrix device and store it as non-coded information. Each character space is constituted of cells or pels. As each character is scanned using an array of photodiodes the various pels of the character cell are binary encoded in accordance with the presence or absence of indicia thereat. Typical character cell dimensions are 24 by 40 pels. This dictates a storage requirement of 960 bits for each character. This translates into a storage capacity requirement of approximately 500 kilobits for a complete page of data, assuming the use of a conventional compression technique.

It will readily be appreciated by those skilled in the art that storage requirements of up to 500 kilobits per page can be highly disadvantageous from the standpoint of space, expense and other factors. One method of reducing this requirement is by optical character recognition. There are several disadvantages and limitations upon the use of conventional OCR techniques with human-readable characters. For one thing most such systems are limited to use with a single character font. In such situations it may be difficult or impossible to use or recognize other types of font such as italicized characters, underlined characters and the like. Further problems in the nature of registration, skewing, segmentation and the like arise as the result of the difficulty in having to scan and store information for the large number of pels defining each individual character. In such situations large arrays of photodiodes or like elements must be accurately positioned if the binary information corresponding to the characters is to be generated accurately. Further problems may arise as a result of the inability to store and communicate representations of typewriter functions such as "tab" in addition to the characters themselves.

Even in instances where the characters to be optically scanned are limited to a single font system, recognition problems may arise due to other factors such as in the case of proportional typing where character width may vary on a character-by-character basis. Moreover, certain font systems and certain types of characters have proven to be incompatible with OCR techniques because of such things as the configuration of the font system or the number of different characters that must be recognized. Thus, in the case of oriental characters where a single alphabet may be comprised of thousands of different characters, OCR techniques may be impractical or impossible because of the extremely large storage capacity required in some cases and the inability to satisfactorily distinguish between and thereby recognize the individual characters in still other cases.

Varieties of equipment have been developed in an effort to provide greater capability in the recognition and processing of different types of printed characters. In U.S. Pat. No. 3,578,136 of Postal, for example, a teletypewriter is modified so as to be able to print different types of characters using coded ink in conjunction with coded photoluminescent components. Examples of systems which provide a machine-reading capability in conjunction with human-readable characters are provided by U.S. Pat. No. 2,958,568 of Hagelbarger, U.S. Pat. No. 3,515,061 of Ritzerfeld, U.S. Pat. No. 3,541,960 of Dilsner, U.S. Pat. No. 3,614,394 of Bindshedler and U.S. Pat. No. 3,719,262 of Taplin. In the Bindshedler patent human-readable characters are also magnetic so as to be machine-readable. In the Hagelbarger patent the various type elements of a typewriter type each human-readable character and at the same time make a magnetic recording thereunder. In the Taplin patent visible and invisible but machine-readable versions of each character are superimposed. In the Ritzerfeld patent coded information is recorded together with the printed matter. In the Dilsner patent a coded character is printed in a space in the middle of conventional uncoded characters.

While the systems described in the above-noted patents solve some of the problems present in the prior art, they still leave much to be desired. For one thing, most such systems require extensive revision to or redesign of conventional printing equipment and the electronics associated therewith. Of at least equal importance is the fact that such systems abandon optical character recognition in favor of magnetic recording and sensing and other techniques which may at the very least be impractical for many applications such as where large volumes of typewritten messages are to be processed.

Accordingly, it would be desirable to provide a method and apparatus capable of printing and recognition of both human-readable and machine-readable characters, which system is of relatively simple design and may require only minor modifications to a standard piece of equipment such as a memory typewriter. It would furthermore be desirable to provide a method and apparatus in which human-readable characters can be made available for optical recognition in relatively simple and straightforward fashion so as to lend itself to use with various different character sets and font systems as well as various spacing or organizational commands.

BRIEF DESCRIPTION OF THE INVENTION

These and other objects are accomplished in accordance with the invention by composer method and apparatus which prints characters in human-readable form on a first portion of a page and thereafter prints representations of the character in an optically recognizable binary encoded form on a second part of the page. The resulting system requires relatively minor modifications to existing equipment such as a memory typewriter in which key stroke signals generated in response to the operation of a keyboard may be stored in a memory in addition to being used to type the conventional, human-readable characters. Following typing of the conventional characters on the first part of the page the stored key stroke signals are organized into blocks of signals to facilitate an error correction function as well as the subsequent typing thereof in optically readable binary encoded form.

In the case of a typewriter using a type ball, the machine-readable binary encoded representations of the conventional characters are printed using a special type ball which replaces the standard type ball. The stored key stroke signals which have been arranged into blocks are used to access type ball positioning information within a different table from a table used during typing of the conventional, human-readable characters. This positioning information is applied to control impacting of the special type ball so as to type groups of binary bits on a different portion of the page from the conventional characters. Thereafter the binary encoded representations are easily read using an appropriate arrangement of photodiodes or other OCR scanners. The binary encoded representations provide for positive and accurate reading of each character independent of the particular font of the character or the fact that the character may come from one of a plurality of different character sets.

In one example of composer apparatus according to the invention the special type ball is provided with raised indicia forming different groups of bits used to print the 8-bit bytes representing various characters and commands. Some groups comprise all eight bits of a given character or command, requiring but a single strike thereof to print the binary encoded representation of the character or command. In other cases the separate strikes of two different 4-bit groups from the special type ball are required to print the optically scanable character or command.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 1 is a plan view of a page showing the manner in which human-readable characters and optically readable binary encoded representations thereof are printed on the same page in accordance with the invention;

FIG. 2 shows several lines of the optically readable binary encoded representations of FIG. 1 in enlarged, detailed form;

FIG. 3 depicts one possible arrangement for each optically readable binary encoded representation within the lines of FIG. 2;

FIG. 4 depicts a different possible arrangement for each optically readable binary encoded representation within the lines of FIG. 2;

DETAILED DESCRIPTION

Figures 5, 6:
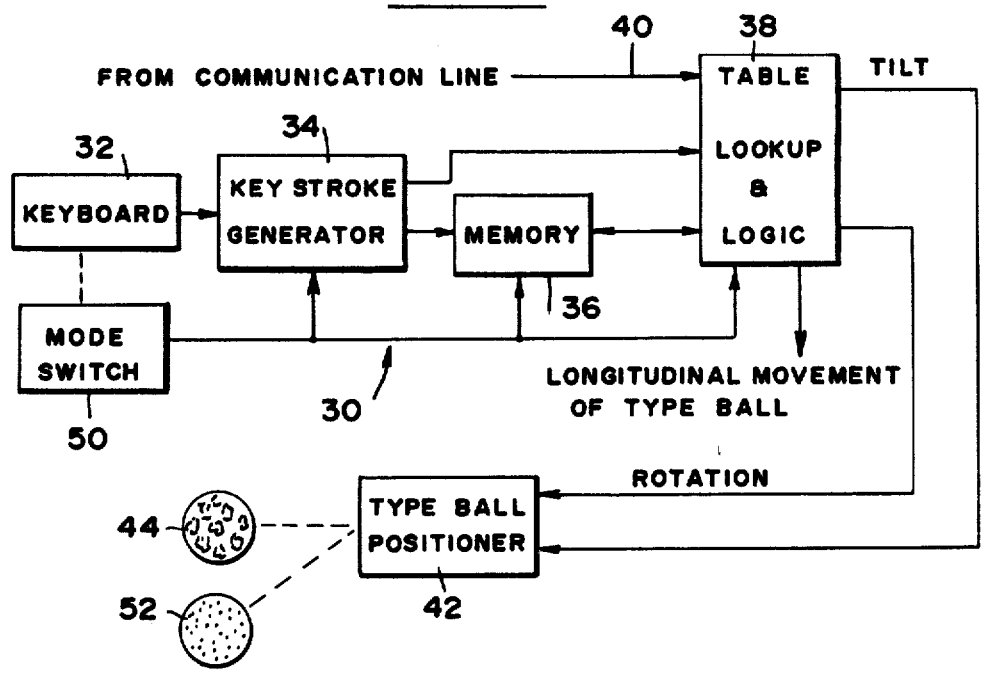
FIG. 5 is a block diagram of a system in accordance with the invention which uses a memory typewriter.
FIG. 6 is an example of type ball positioning signals comprising a table in the arrangement of FIG. 5.

FIG. 1 depicts a page 10 comprising a single sheet of paper 12. The page 10 is divided into a first portion 14 thereof in which standard, human-readable characters 16 such as those printed by a typewriter are printed and a second portion 18 spaced-apart from the first portion 14 and in which lines of optically readable binary encoded representations 20 of the standard, human-readable characters 16 are printed. As described hereafter each representation 20 comprises the presence and absence of dots representing the various bits of a binary representation of one of the standard characters 16. The representations 20 may also represent commands to be carried out in the printing of the standard characters 16 such as the common typewriter "tab" command. Following printing of the various standard characters 16, a stored signal corresponding thereto is converted into one of the representations 20 which is then printed in the second portion 18 of the page 10.

For purposes of explanation the page 10 of FIG. 1 is shown and is hereafter described in terms of the standard characters 16 being typed on the upper portion of the page and the representations 20 being typed thereunder on a lower portion of the page. However, it is within the scope of the invention to print the representations 20 elsewhere such as on the back of the page 10, on a separate sheet of paper or in any place convenient for the optical reading of the representations 20.

FIG. 2 depicts several lines 22 of the representations 20 within the second portion 18 of the page 10 in enlarged, detailed form. Each of the lines 22 has a length L, a height H and is spaced apart from adjacent lines by a distance S. The representations 20, one of which is shown at the lefthand edge of the first line 22 of FIG. 2, are printed along the length of each of the lines 22 so as to have a height H equal to the height H of each line. The memory typewriter described hereafter types each line 22 making a sweep from left to right using a special type ball to create the binary representations 20.

FIG. 3 depicts one possible arrangement for each of the representations 20. In the arrangement of FIG. 3 the representation 20 which has a height H equal to the height H of each line 22 has a length l along the length of the line and is divided into two different dot columns 24 and 26. Each of the dot columns 24 and 26 has a height H' which is slightly less than the height H of the representation 20. The representation 20 comprises an 8-bit byte, the first four bits of which comprise the dot column 24 and the second four bits of which comprise the dot column 26. The space reserved for each dot within the columns 24 and 26 has a width d' and a height h.

Because the arrangement of FIG. 3 is divided into the two different dot columns 24 and 26, each of the dot columns is printed independently of the other using a separate strike of the special type ball. The special type ball used to type the binary encoded representations 20 is provided with a number of 4-bit groups. One of the 4-bit groups is used to type the first dot column 24 during a first strike. Thereafter, the same or in most instances a different one of the 4-bit groups is used to type the second dot column 26 during a second strike of the type ball. The typewriter may type both of the dot columns 24 and 26 of each representation 20 before typing the next representation 20. Alternatively, the first dot column 24 of each representation 20 is types during a first sweep of the special type ball across the page, following which the second dot column 26 of each representation 20 is typed during a second sweep or overstrike of the special type ball across the page.

FIG. 4 depicts a different arrangement for typing each representation 20. In the arrangement of FIG. 4, each representation 20 comprises a single dot column 28 having all eight bits of the 8-bit byte which comprises the representation therein. Each column 28 has a width d and a height H which is equal to the height H of each of the lines 22 of FIG. 2. Each dot within a column 28 has a width d equal to the width of the column 28 and a height h. Adjacent dot columns 28 are spaced apart from one another by a small distance which combines with the width d of the dot column 28 so as to comprise a total distance l. Each dot column 28 in the arrangement of FIG. 4 may be typed using a single strike of an 8-bit group of bits on a special type ball. Alternatively a first 4-bit group on the special type ball can be used to type the four top bits of each column 28, following which the same or in most instances a different 4-bit group is used to type the four bottom bits of the column.

FIG. 5 depicts a system 30 in accordance with the invention which includes the basic components of a memory typewriter. The system 30 includes a keyboard 32 which is coupled to a key stroke generator 34. The key stroke generator 34 responds to actuation of the various keys of the keyboard 32 by generating key stroke signals and storing them in a memory 36 in conventional fashion. A typical memory typewriter divides the keyboard into a matrix such that each key stroke signal represents the portion of the matrix occupied by the corresponding key. The key stroke signals are converted into signals which position a type ball so as to print the desired characters as the type ball impacts paper through a ribbon in a succession of strikes.

In the arrangement of FIG. 5 a table lookup and logic circuit 38 is arranged to receive key stroke signals from the generator 34 both directly and via the memory 36. The table lookup and logic circuit 38 is also coupled to receive key stroke signals from a communication line via a lead 40. The table lookup and logic circuit 38 includes two different tables for generating type ball positioning signals in response to the key strokes in addition to logic circuitry for arranging key stroke signals stored in the memory 36 into blocks together with error correction code data. The logic circuitry can be arranged to access the read only memories (ROM's) or other appropriate apparatus comprising the table either directly or through a random access memory (RAM) in conventional table lookup fashion.

The type ball positioning signals comprise separate tilt and rotation signals applied to a type ball positioner 42 for a type ball 44. The type ball positioner 42 operates in conventional fashion in response to the tilt and rotation signals to tilt and rotate the type ball 44 to the desired extent in preparation for each strike of the paper and ribbon. The table lookup and logic circuit 38 also provides signals providing for the longitudinal stepping movement of the type ball 44 between the succession of impacting strikes across the width of the paper.

FIG. 6 comprises a table containing a typical set of tilt and rotation signals for each of the keys of a typewriter keyboard. Taking a key 46 by way of example, when this key is struck the resulting key stroke signal results in the generation of type ball positioning signals causing the type ball 44 to rotate in a counterclockwise direction by two units (R-2) and tilt from a nominal position by one unit (T1). With the type ball 44 so positioned, the letter "m" is typed on the paper. If the shift key of the typewriter is activated prior to striking the key 46, the type ball 44 is still rotated and tilted by R-2 and T1 respectively. However the letter "M" is typed because of the changed position of the carriage of the typewriter relative to the type ball 44.

If another key 48 is then struck, the type ball 44 is rotated three units in a clockwise direction (R+3) and is tilted two units (T2) from the nominal position. This results in the typing of the character "z".

Referring again to FIG. 5, the keyboard 32 includes a mode switch 50 which can be switched between a normal mode and an encode mode by the typewriter operator. When the mode switch 50 is in the normal mode, the typewriter functions in conventional fashion by passing the key strokes generated by the generator 34 to a first table within the table lookup and logic circuit 38 while at the same time storing the key strokes in the memory 36. The first table which may be like that shown in FIG. 6 converts each key stroke signal into type ball positioning signals in the form of tilt and rotation signals which are applied to position the type ball 44 via the type ball positioner 42. The positioner 42 may comprise a conventional motor driven ratchet mechanism. The system 30 continues in the normal mode until a given text is typed or until the first portion 14 of the page 10 of FIG. 1 is completed. At that point the typewriter is repositioned to the second portion 18 of the page 10 and the standard type ball 44 is replaced with a special type ball 52. The special type ball 52 is like the standard type ball 44 except that the raised indicia thereof defines different groups of binary bits. Each "1" bit is represented by a dot of rectangular configuration and each "0" bit is represented by the absence of a dot. Consequently, the groups of bits on the outer surface of the special type ball 52 are defined by raised portions for printing dots in selected bit spaces.

With the mode switch 50 switched to the encode mode and the standard type ball 44 replaced by the special type ball 52, the key stroke signals stored in the memory 36 are arranged into blocks and error correction code processed by the logic circuitry within the circuit 38. A second table within the table lookup and logic circuit 38 different from the first table thereof then converts each key stroke signal stored in the memory 36 into tilt and rotation signals applied via the type ball positioner 42 to position the special type ball 52. The special type ball 52 repeatedly impacts the paper and ribbon with a series of strikes under the control of a longitudinal type ball movement signal from the table lookup and logic circuit 38 to type the binary encoded representations 20 in the second portion 18 of the page 10.

Figure 7:
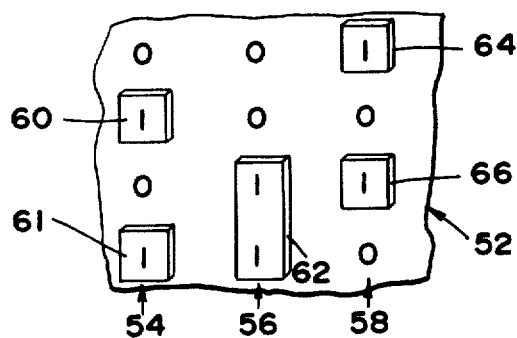
FIG. 7 is a perspective view of a small portion of the surface of the special type ball used in the system of FIG. 5.

A portion of the outer surface of the special type ball 52 is shown in FIG. 7 as comprising raised portions thereof defining three different bit groups 54, 56 and 58. Each of the groups 54, 56 and 58 is comprised of four bits so as to be capable of printing one of the dot columns 24 and 26 in the arrangement of FIG. 3 or one-half of the dot column 28 in FIG. 4. The bit group 54 comprises the bit pattern 0101. The two "1's" are provided by separate raised elements 60 and 61 on the outer surface of the special type ball 52. The "0's" are represented by the absence of raised elements. The second bit group 56 comprises the binary pattern 0011. In this instance the two adjacent ones are provided by a single raised element 62. The third bit group 58 comprises the binary pattern 1010. The "1's" are provided by two different raised elements 64 and 66. The "0's" are provided by the absence of raised elements.

Each of the bit groups 54, 56 and 58 is positioned for impacting against the paper and ribbon of the typewriter by a particular pair of tilt and rotation signals of the type shown in the table of FIG. 6. In the example of FIG. 7 which corresponds to the arrangement of FIG. 3, each character representation 20 is comprised of two different groups of four bits each requiring two different pairs of tilt and rotation signals to effect the printing of the two different 4-bit groups. In such instances the second table within the table lookup and logic circuit 38 provides two different pairs of tilt and rotation values for each key stroke signal so as to properly the special type ball 52 for the two different strikes thereof necessary to print the eight bits of the binary encoded representation 20. The pairs of signals are applied to the type ball positioner 42 in succession in cases where the second 4-bit group of each representation is typed immediately following the first 4-bit group. In cases where the first 4-bit group of each representation 20 corresponding to the first dot column 24 in FIG. 3 is typed during a first sweep of the type ball across the line followed by an overstrike in which the second 4-bit group of each representation 20 corresponding to the dot column 26 of FIG. 3 is typed in the intervening spaces, the first pair of tilt and rotation signals provided by the second table of the table lookup and logic circuit 38 are used to position the special type ball 52 during the first movement of the special type ball 52 across the line. During the overstrike the second pair of tilt and rotation signals is then provided from the second table of the table lookup and logic circuit 38.

The lefthand end of the first line 22 in FIG. 2 shows the different columns of a binary encoded representation 20 as typed by the special type ball 52. The particular representation 20 which is shown in FIG. 2 defines a character or command having the binary coded representation 10110010. Each binary "1" is comprised of a printed or block rectangle on the paper. Each binary "0" is represented by the absence of a printed or black rectangle on the paper. The resulting dot code is easily read using optical character recognition techniques. For example, each of the lines 22 can be read by the single sweep of a column of four photodiodes coupled to circuitry which separates each group of four bits by small increments of time so that a succession of eight bits is generated for each representation 20. As shown in FIG. 1 an optical scanning device 68 comprising a large column of photodiodes or similar OCR devices can be used to read all of the representations 20 within the second portion 18 of the page 10 during a single sweep of the device 68 across the page 10. The device 68 which can be mounted on the type ball mount of the typewriter for convenience in sweeping the page during reading of the representations 20 includes several thousand photodiodes so as to be capable of reading 500 to 1000 or more of the lines 22 in one pass.

As previously noted the arrangements shown in FIGS. 3 and 4 have a length l per representation 20 such that L/l bytes or representations can be typed in each line 22. In the arrangement of FIG. 4 the byte spacing l depends on the unit horizontal escapement distance of the typewriter. The unit horizontal escapement distance is typically 1/96 inch for certain presently available memory typewriters. In such cases the minimum character width 1 is chosen to have at least an equal value and preferably a greater value on the order of $3 \times 1/96$ inch or 1/32 inch.

As previously noted each dot column 28 in the arrangement of FIG. 4 can be printed with a single strike of a group of eight bits on the special type ball 52. Alternatively, each dot column 28 can be typed using two strikes of two different 4-bit groups. In the first such strike the first four bits comprising the top half of the column 28 are typed using an appropriate 4-bit group on the special type ball 52. Thereafter, the lower four bits of the column are typed, typically in a separate sweep of the special type ball 52 across the page, using an appropriate 4-bit group on the special type ball 52. In such an arrangement the following set of dimensions can be used for a piece of paper measuring $8\frac{1}{2} \times 11$ inches:

$l = 1/32$ inch
$d = 20$ mils
$h = 10$ mils
$H = 80$ mils
$S = 20$ mils
$L = 8$ inches
$N = 5$ where N is the number of lines 22. Such dimensions provide 32 of the representations 20 per horizontal line inch. With 5 lines, each 8 inches long, the page 10 has a capacity of 1280 binary encoded characters or commands in a stripe 8 inches long and 0.5 inch high comprising the second portion 18 of the page 10. Of course, additional lines 22 can be provided as necessary to encode all of the characters and commands required for a given page.

If the 1/32 inch escapement movement of the type ball applies in the example of FIG. 3, then the appropriate dimensions become:

$l = 1/32$ inch
$d' = 10$ mils
$h = 16$ mils
$H' = 64$ mils
$H = 80$ mils

This arrangement also provides 32 characters or commands per horizontal line inch.

Smaller dimensions can be used to provide greater compaction of the binary encoded data on the page subject to the minimum escapement horizontal movement of the type ball and the resolution necessary for satisfactory OCR scanning. While a horizontal escapement distance can be chosen to provide a "1" of 20 mils or even less, resolution considerations may dictate against excessive miniaturization. For example, whereas dots measuring 10 mils $\times$ 16 mils or 10 mils $\times$ 20 mils are still relatively easy to accurately scan when working with at least five repetitive copies (copy-of-a-copy, etc.), smaller dots on the order of 8 mils $\times$ 8 mils have presented problems. At such sizes, the dots tend to disappear or enlarge with multiple copies, and dirt is often mistaken for a dot.

Figure 8:
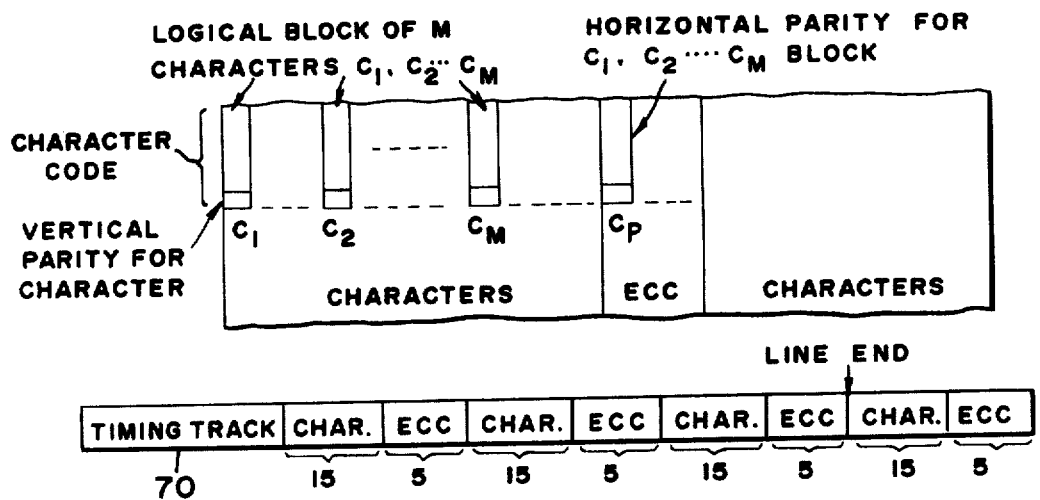
FIG. 8 depicts a portion of the table look-up and logic of FIG. 5 indicating the manner in which blocks of characters are formed using key stroke signals generated by the typewriter keyboard.
Figure 9:
FIG. 9 depicts a portion of the data shown in FIG. 8 organized into a line in preparation for printing of the optically readable binary encoded representations thereof.

As previously noted the table lookup and logic circuit 38 of FIG. 5 arranges the key strokes stored in the memory 36 into blocks when the mode switch 50 is switched to the encode mode. The manner in which this is accomplished is shown in FIGS. 8 and 9. FIG. 8 depicts the manner in which the 8-bit bytes represented by the key strokes stored in the memory 36 are organized into lines of characters in preparation for printing of the binary encoded representations 20. FIG. 9 depicts a typical resulting line.

Referring to FIG. 8 the logic circuitry of the table lookup and logic circuit 38 arranges the 8-bit bytes representing key strokes stored in the memory 36 into a group of characters followed by several 8-bit bytes used for error correction code (ECC). As seen in FIG. 9 the first line of the binary encoded information of the second portion 18 of the page 10 is begun with a timing track 70 used to ready and position OCR scanning devices when the binary encoded representations are read. This is followed by the various representations 20 of the standard, human-readable characters in the first portion 14 of the page 10 and appropriate commands. The characters (and commands) are divided into groups of fifteen of the representations 20 with each group of fifteen being followed by five bytes of error correction code.

FIG. 8 shows a portion of a line being arranged into the blocks of fifteen characters/commands and five ECC bytes. The first seven bits of each 8-bit byte representing a character or command comprise the character code while the eighth bit provides vertical parity for the character. Each 8-bit ECC byte provides horizontal parity for a block of the bytes. In the example of FIG. 8 one block is defined as comprising character or command bytes $C_1$, $C_2$ and $C_M$ together with a parity byte $C_P$. The eighth bit of the four different bytes defines the vertical parity for the block of characters $C_1$, $C_2$, $C_M$ and $C_P$. The ECC byte $C_P$ defines the horizontal parity for the block of bytes. This arrangement corrects both random and burst errors.

The various parity bits are arranged to provide error checking. For example, the error correction code may be arranged so that there must always be an odd (or even) total number of "1's" in the eighth bits of the bytes $C_1$, $C_2$, $C_M$ and $C_P$. Other groups of bytes between the bytes $C_1$, $C_2$ and $C_M$ are arranged together with other ECC bytes to provide the same parity check. In the particular line and block arrangement of FIG. 9 each group of fifteen characters and five ECC bytes is arranged into five different blocks with each block being comprised of three character bytes and an ECC byte. Whenever the line being composed reaches a length approaching the maximum line length as determined by the paper width, a line end marker is used as shown in FIG. 9 to designate each location in the memory where a new line is to begin.

Figure 10:
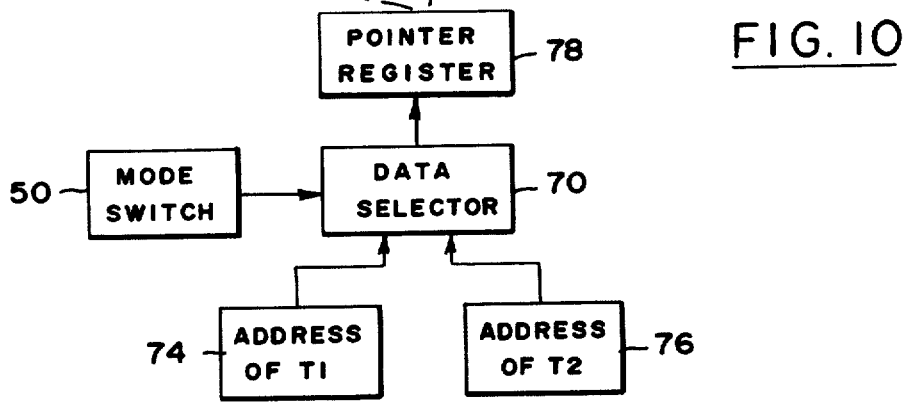
FIG. 10 is a block diagram of a portion of the system of FIG. 5.

FIG. 10 depicts the mode switch 50 together with a portion of the table lookup and logic circuit 38. The mode switch 50 is coupled to control a data selector 70 coupled to provide either an address 74 of a code table T1 or an address 76 of a code table T2 to a pointer register 78. The point register 78 points to either a code table T1 or a code table T2 as determined by the most recent switching of the data selector 70. The code table T1 contains the type ball positioning signals to be used during typing of the standard, human-readable characters during the normal mode. The code table T2 contains the type ball positioning signals to be used when typing the binary encoded representations 20 in response to the key strokes stored in the memory 36 during the encode mode.

When the mode switch 50 is in the normal mode, the data selector 70 applies the address 74 for the code table T1 to the pointer register 78. The pointer register 78 in turn designates the code table T1, such that each generated key stroke produces a corresponding type ball positioning signal from the table T1. The type ball positioning signal results in typing of the desired character using the standard type ball. When the mode switch 50 has changed to the encode mode, the data selector 70 responds by applying the address 76 of the code table T2 to the pointer register 78. The pointer register 78 responds by directing the stored key strokes to the code table T2 for generation of the type ball positioning signals to position the special type ball 52 to the desired positions for typing of the binary encoded representations 20.

The first seven bits of each 8-bit character or command byte serve to identify the character or command with the eighth bit acting as a parity bit. Because the seven bits represent the character or command in binary fashion, there are $2^7$ or 128 different possible characters and commands. This allows for 96 characters or commands and 32 ECC bytes which is adequate for practically all applications. Using a standard sized type ball and the dimensions given in the earlier examples, it is possible to include 96 groups of 8 bits and 16 groups of 4 bits on one special type ball. The 96 groups of 8 bits may comprise 64 of the most common characters and commands plus 32 ECC bytes. The remaining 32 characters and commands are comprised of different pairs of the 4-bit groups.

As previously pointed out a typical prior art arrangement which divides each character space into 24 pels$\times$40 pels typically requires about 500 kilobits of storage capacity per page. On the other hand, arrangements according to the invention where each character can be scanned in terms of 8 bits are capable of storing an entire page in 24 kilobits of storage capacity.

It will be appreciated by those skilled in the art that the principles of the present invention are not limited to typewriters and other impact printers but apply as well to ink jet, thermal and laser printers. In the case of an ink jet printer each bit space of a representation 20 can be divided into a 4$\times$4 ink jet matrix. By printing each "1" bit using an ink jet at the center four positions of each 4$\times$4 matrix, a dot is produced which is easily detected with optional scanners and which does not run into or otherwise interfere with the detection of adjacent blank 4$\times$4 matrices as "0's".

While the invention has been particularly shown and described with reference to preferred embodiment thereof, it will be understood by those skilled in the art that the foregoing and other changes in form and details may be made therein without departing from the spirit and scope of the invention.

What is claimed is:

1. An arrangement for typing human readable characters and optically readable binary representations of the characters on the same printable means comprising:
   means for generating signals representing characters to be typed;
   means for storing the signals representing characters to be typed in a first format and a second format including optically readable binary representations;
   mode switch means for indicating either of first and second modes of operation;
   means responsive to an indication of the first mode of operation by the mode switch means for typing the characters represented by the signals in a first area of printable means; and
   means responsive to an indication of the second mode of operation by the mode switch means and responsive to the signals stored in the means for storing for typing said optically readable binary representations of the characters represented by the signals in a second area of the printable means.

2. The invention set forth in claim 1, wherein the means for storing said optically readable binary representations includes a plurality of different groups of bits therein, each of the groups comprising a plurality of bits defining at least a portion of one of the binary representations.

3. The invention set forth in claim 2, wherein said stored optically readable binary representations includes a first group of bits for typing as the type ball is moved in substantially equal increments along each of the succession of lines across the second area of the printable means and a second group of bits for typing a selected one of the different groups of type at each of selected ones of the substantially equal increments.

4. The invention set forth in claim 3, wherein each of at least some of the first and second groups of bits comprises four bits extending along a line which is generally perpendicular to the direction of elongation of each of the succession of lines across the second area of the printable means, different pairs of the at least some of the different groups of bits representing different characters.

5. The invention set forth in claim 3, wherein each of at least some of the different groups of bits comprises eight bits extending along a line which is generally perpendicular to the direction of elongation of each of the succession of lines across the second area of the printable means.

6. The method for operating composer apparatus comprising the steps of:
   printing data in a human readable form in a first area of a printable medium;
   storing representations of the data as the data is printed on the printable medium;
   converting the stored data into a binary, machine-readable form; and
   printing the converted data in the binary, machine-readable form in a second area of the printable medium spaced-apart from the first area.

7. The invention set forth in claim 6, comprising the additional step after the first claimed printing step and before the second claimed printing step of replacing a first removable type ball with human readable characters thereon with a second removable type ball having data in binary, machine-readable form thereon.

8. The invention set forth in claim 7, wherein the step of converting comprises converting each character of the stored data into a standard sized group of binary bits and wherein the second removable type ball has groups of raised indicia thereon defining the standard sized group of binary bits for a plurality of characters.

9. The method for operating composer apparatus comprising the steps of:
   typing characters in a human readable form in a first area of a sheet of paper during a first mode of operation;
   storing a representation of each character typed by the typewriter during said first mode of operation;
   accessing each of said representations of a character stored during said first mode of operation; and
   typing a machine-readable coded equivalent of the character in a second area of the sheet of paper spaced-apart from the first area during a second mode of operation subsequent to the first mode.

10. The invention set forth in claim 9, comprising the additional step of installing a type ball having raised portions thereof defining groups of binary bits comprising the machine-readable coded equivalent of the characters stored in said apparatus prior to the second claimed typing step.

11. A method for printing human readable characters and machine-readable representations of the characters on the same sheet of paper comprising the steps of:
   generating a different key stroke signal in response to actuation of each key of the keyboard;
   storing the key stroke signals generated by said key actuation;
   storing a first set of print element positioning signals corresponding to different possible characters to be printed;
   storing a second set of print element positioning signals corresponding to the different possible characters to be printed;
   printing on a sheet of paper in response to said stored key stroke signals and said first set of print element positioning signals, human readable characters on a first part of the sheet of paper; and
   printing in response to said stored key stroke signals and said second set of print element positioning signals, machine-readable characters on a second part of the sheet of paper.

12. The invention set forth in claim 11, comprising the additional step of arranging the signals representing the key stroke signals stored into blocks of signals separated by error correction codes prior to selecting corresponding print element positioning signals.

13. The invention set forth in claim 11, comprising the additional steps of installing a first type ball for printing the human readable characters and installing a second type ball for printing the machine-readable characters.

14. The invention set forth in claim 13, wherein the second claimed printing step comprises printing each of at least some of the machine-readable characters with a single impact of the sheet of paper.

15. The invention set forth in claim 13, wherein the second claimed printing step comprises controlling, with the second type ball installed, by undergoing successive sweeps across the width of the sheet of paper, to print a first portion of each of at least some of the machine-readable characters with a single impact of the sheet of paper during a given sweep across the width of the sheet of paper, and a second portion of each of the at least some of the machine-readable characters with a single impact of the sheet of paper during a subsequent sweep across the width of the sheet of paper.

16. A method for typing human readable characters and optically readable binary representations of the characters on the same printable means comprising the steps of:
   generating signals representing characters to be typed;
   storing the signals representing characters to be typed;
   indicating either of first and second modes of operation;
   typing the characters represented by the signals in human readable form in a first area of the printable means in response to an indication of the first mode of operation responsive to said stored signals; and
   typically optically readable binary representations of the characters represented by the signals in a second area of the printable means in a succession of lines across a second area of the printable means in response to an indication of the second mode of operation responsive to said stored signals.

17. The invention set forth in claim 16, comprising the additional step of installing prior to the second typing step, a type ball having optically readable binary representations thereon arranged in different groups of type thereon, each of the groups comprising a plurality of bits defining at least a portion of one of the binary representations.

18. The invention set forth in claim 17, wherein said second typing step comprises typing optically readable binary representations as said type ball is moved in substantially equal increments along each of a succession of lines across the second area of the printable means by impacting the printable means with a selected one of the different groups of type at each of selected ones of the substantially equal increments.

* * * * *

UNITED STATES PATENT AND TRADEMARK OFFICE
CERTIFICATE OF CORRECTION

PATENT NO. : 4,247,907
DATED : January 27, 1981
INVENTOR(S) : ROBERT C. DURBECK ET AL It is certified that error appears in the above-identified patent and that said Letters Patent are hereby corrected as shown below:

IN THE CLAIMS:

Claim 16, Col. 12, line 65, change "typically" to --typing--.

Signed and Sealed this

Twelfth Day of May 1981

[SEAL]

Attest:

RENE D. TEGTMEYER

Attesting Officer  Acting Commissioner of Patents and Trademarks